United States Patent
Soler et al.

(10) Patent No.: US 10,778,054 B2
(45) Date of Patent: Sep. 15, 2020

(54) ELECTRIC DRIVE MOTOR

(71) Applicant: Jaguar Land Rover Limited, Coventry, Warwickshire (GB)

(72) Inventors: Jose Soler, Coventry (GB); Alexandros Michaelides, Coventry (GB); Istvan Kiraly, Coventry (GB)

(73) Assignee: JAGUAR LAND ROVER LIMITED, Coventry, Warwickshire (GB)

( * ) Notice: Subject to any disclaimer, the term of this patent is extended or adjusted under 35 U.S.C. 154(b) by 126 days.

(21) Appl. No.: 15/570,863

(22) PCT Filed: Jun. 8, 2016

(86) PCT No.: PCT/EP2016/063061
§ 371 (c)(1),
(2) Date: Oct. 31, 2017

(87) PCT Pub. No.: WO2016/198468
PCT Pub. Date: Dec. 15, 2016

(65) Prior Publication Data
US 2018/0138764 A1    May 17, 2018

(30) Foreign Application Priority Data

Jun. 12, 2015   (GB) .................................. 1510273.4

(51) Int. Cl.
*H02K 1/27* (2006.01)
*H02K 7/00* (2006.01)
*H02K 29/03* (2006.01)

(52) U.S. Cl.
CPC .......... *H02K 1/2766* (2013.01); *H02K 1/276* (2013.01); *H02K 1/2746* (2013.01); *H02K 7/006* (2013.01); *H02K 29/03* (2013.01); *H02K 2213/03* (2013.01)

(58) Field of Classification Search
CPC ........ H02K 1/27; H02K 1/274; H02K 1/2746; H02K 1/276; H02K 1/2766; H02K 1/277;
(Continued)

(56) References Cited

U.S. PATENT DOCUMENTS

| 2003/0094875 | A1  | 5/2003 | Sakuma et al. |
| 2009/0026865 | A1* | 1/2009 | Aota ...................... H02K 1/276 |
| | | | 310/156.01 |

(Continued)

FOREIGN PATENT DOCUMENTS

| CN | 101326699 A | 12/2008 |
| CN | 102916544 A | 2/2013 |

(Continued)

OTHER PUBLICATIONS

First Office Action and English Language Translation, CN Application No. 201680025022.0, dated Jan. 4, 2019, 19 pp.

(Continued)

*Primary Examiner* — Tran N Nguyen
(74) *Attorney, Agent, or Firm* — Miller Nash Graham & Dunn LLP

(57) ABSTRACT

The present disclosure relates to an electric drive motor (101; 201) for a vehicle. The electric drive motor (101; 201) has a stator (103) having a plurality of slots (107); and a rotor (102; 202) having a plurality of poles (106; 206). The poles (106; 206) each have at least a first permanent magnet (104; 204) centred on a d-axis of the pole (106; 206); and a plurality of flux barriers (109; 209) for disrupting at least an n-th order torque harmonic of the electric drive motor (101). Proximal to an outer surface of the rotor (102; 202), a first angular period (x11) between first and secondary flux barriers is defined by the equation (xi1=tao/n1), whereby: (xi1) is the first angular period; (tao) is the pole step; and n1 is an order number of a torque harmonic to be disrupted.

16 Claims, 4 Drawing Sheets

(58) Field of Classification Search
CPC ........ H02K 1/2773; H02K 7/00; H02K 7/006; H02K 21/14; H02K 21/16
See application file for complete search history.

(56) References Cited

U.S. PATENT DOCUMENTS

| | | | |
|---|---|---|---|
| 2009/0224624 | A1 | 9/2009 | Kumar et al. |
| 2010/0079023 | A1 | 4/2010 | Jang |
| 2010/0079026 | A1* | 4/2010 | Han ............... H02K 1/2766 310/156.53 |
| 2010/0117477 | A1* | 5/2010 | Yoshino ........... H02K 1/276 310/156.53 |
| 2012/0242182 | A1 | 9/2012 | Yabe et al. |
| 2013/0093284 | A1 | 4/2013 | Utaka |
| 2014/0191628 | A1 | 7/2014 | Nakano et al. |

FOREIGN PATENT DOCUMENTS

| | | |
|---|---|---|
| CN | 102916544 B | 6/2015 |
| CN | 105958689 A | 9/2016 |
| EP | 1 942 572 A1 | 7/2008 |
| EP | 2 485 369 A1 | 8/2012 |
| EP | 2 600 498 A1 | 6/2013 |
| EP | 2 916 435 A1 | 9/2015 |
| JP | 2003-158838 A | 5/2003 |
| JP | 2007-97387 A | 4/2007 |
| JP | 2011-147313 A | 7/2011 |
| JP | 2012-105410 A | 5/2012 |
| WO | WO 2011/040020 A1 | 4/2011 |
| WO | WO 2011/096094 A1 | 8/2011 |
| WO | WO 2014/069438 A1 | 5/2014 |

OTHER PUBLICATIONS

Patents Act 1977: Combined Search and Examination Report under Sections 17 and 18(3), UKIPO Application No. GB1510273.4, dated Jan. 4, 2016, 5 pp.
Patents Act 1977: Combined Search and Examination Report under Sections 17 and 18(3), UKIPO Application No. GB1610012.5, dated Nov. 28, 2016, 6 pp.
International Search Report and Written Opinion of the International Searching Authority, International Application No. PCT/EP2016/063061, dated Sep. 9, 2016, 13 pp.
Office Action with English language summary, JP Application No. 2017-560177, dated Nov. 6, 2018, 7 pp.
Office Action with machine language translation and English language summary, JP Application No. 2017-560177, dated Aug. 6, 2019, 11 pp.
Communication pursuant to Article 94(3) EPC, EP Application No. 16727718.5, dated Sep. 5, 2019, 6 pp.

* cited by examiner

ELECTRIC DRIVE MOTOR

RELATED APPLICATIONS

This application is a 35 U.S.C. § 371 national stage application of PCT Application No. PCT/EP2016/063061, filed on Jun. 8, 2016, which claims priority from Great Britain Patent Application No. 1510273.4, filed on Jun. 12, 2015, the contents of which are incorporated herein by reference in their entireties. The above-referenced PCT International Application was published in the English language as International Publication No. WO 2016/198468 A1 on Dec. 15, 2016.

TECHNICAL FIELD

The present disclosure relates to an electric drive motor. More particularly, but not exclusively, the present disclosure relates to an electric drive motor having primary and/or secondary flux barriers. Aspects of the invention relate to a motor and to a vehicle.

BACKGROUND

It is known to use an electric drive motor 1 to generate a traction force to propel a vehicle, such as an automobile. A quadrant of the electric drive motor 1 is shown in FIG. 1. The electric drive motor 1 is a permanent magnet synchronous motor comprising a rotor 2 and a stator 3. The rotor 2 comprises a plurality of laminations of a ferromagnetic material to form a rotor iron. First and second magnets 4, 5 are embedded in the rotor to form a plurality of rotor poles 6. The first and second magnets 4, 5 are permanent magnets (PM) and generate a magnetic flux. An assumed reference frame is shown in FIG. 1, where the rotor pole 6 has a d-axis aligned to the permanent magnet (PM) flux, and a q-axis arranged transverse to the direction of the rotor pole 6 (i.e. transverse to the d-axis). The angular extent of each rotor pole 6 (i.e. the included angle between the +q-axis and the −q-axis) is referred to herein as the pole step. An air gap is maintained between the rotor 2 and the stator 3.

The first and second magnets 4, 5 in each rotor pole 6 are arranged in first and second layers L1, L2 one above the other in a radial direction. As shown in FIG. 1, a pair of said first magnets 4-1, 4-2 is arranged in the first layer L1 and one of said second magnets 5 is arranged in the second layer L2. The first and second magnets 4, 5 in the first and second layers L1, L2 are arranged symmetrically about, and substantially perpendicular to the d-axis. The stator 3 comprises a plurality of slots 7 extending radially inwardly to support coil windings 8. The electric drive motor 1 comprises forty-eight (48) slots 7 and eight (8) rotor poles 6. By energising the coil winding 8, a torque is generated to drive the rotor 2.

The rotor 2 comprises a plurality of first and second cavities 9, 10 associated with the first and second magnets 4, 5 in said first and second layers L1, L2 respectively. The first and second cavities 9, 10 are arranged to influence the magnetic flux generated by the first and second magnets 4, 5. In the illustrated arrangement, the first and second cavities 9, 10 are elongated and extend at an acute angle relative to the d-axis. The first cavities 9-1, 9-2 extend outwardly from the lateral ends of the first magnets 4-1, 4-2 in the first layer L1; and the second cavities 10-1, 10-2 extend outwardly from the lateral ends of the second magnet 5 in the second layer L2. The first and second cavities 9, 10 are formed within the rotor 2 such that the outer surface of the rotor 2 is continuous.

It will be appreciated that the distribution of ferromagnetic material in the rotor 2 and the stator 3 is uneven due to the presence of the first and second magnets 4, 5 in the rotor 2; the slots 7 in the stator 3; and the first and second cavities 9, 10. As a result, the torque and voltage characteristics of the electric drive motor 1 contain harmonic components. The voltage harmonics are developed by the harmonics of flux density distribution in the air gap, the harmonic order number being equivalent to the harmonic order number of a voltage high harmonic. The torque harmonics differ from the voltage harmonics, since they are developed by the interaction of harmonic components. For example the 6th torque harmonic component is the result of the interaction of the base harmonic with the 5th and 7th order harmonics of flux density distribution (6=5+1=7−1).

The interaction of the harmonic components results in torque ripples which can result in generation of noise and vibrations when the electric drive motor 1 is operating. These torque ripples are typically undesirable.

It is against this background that the present invention has been conceived. At least in certain embodiments, the present invention seeks to reduce or ameliorate at least some of the aforementioned shortcomings.

SUMMARY OF THE INVENTION

Aspects and embodiments of the present invention relate to an electric drive motor and to a vehicle including same.

According to a further aspect of the present invention there is provided an electric drive motor for a vehicle. The electric drive motor may comprise a stator having a plurality of slots. The electric drive motor may comprise a rotor having a plurality of poles. Each pole may comprising at least a first permanent magnet centred on a d-axis of the pole and a plurality of flux barriers for disrupting at least an $n^{th}$ order torque harmonic of the electric drive motor. In an embodiment, proximal to an outer surface of the rotor, a first angular period $\xi_1$ between first and second primary flux barriers is defined by:

$$\xi_1 = \frac{\tau}{n_1}$$

where: $\xi_1$ is the first angular period;
$\tau$ is the pole step; and
$n_1$ is an order number of a torque harmonic to be disrupted.

By segmenting the poles, the torque harmonic may be reduced. The corresponding torque harmonic may thereby be disrupted resulting in a smaller torque ripple.

The first and second torque harmonics may be disrupted resulting in a smaller torque ripple.

The flux barriers may be in the form of cavities in the rotor. The cavities may be air-filled, for example.

The angular period between the flux barriers is measured with respect to corresponding lateral edges of adjacent flux barrier. The flux barriers may extend radially and in these arrangements the angular period is measured at a radially outer end of the flux barriers.

The pole may comprise at least one second permanent magnet. The first and second permanent magnets may be arranged in first and second radially-separated layers. In certain embodiments, the pole may comprise at least one third permanent magnet. The first, second and third permanent magnets may be arranged in first, second and third radially-separated layers.

The plurality of flux barriers may comprise one or more primary flux barrier. The primary flux barrier may each comprise a through hole extending through the rotor. The through holes may extend substantially parallel to a longitudinal axis of the rotor.

A pair of first primary flux barriers may be associated with said first permanent magnet and disposed symmetrically about said d-axis. A pair of second primary flux barriers may be associated with said at least said second permanent magnet and disposed symmetrically about said d-axis. The first and second primary flux barriers on each side of the pole may be separated from each other by said first angular period $\xi_1$. The first pair of primary flux barriers may be inset from the second primary flux barriers.

In one embodiment the stator has seventy-two (72) slots and the rotor has eight (8) poles. The order number $n_1$ may be six (6) such that at least the sixth ($6^{th}$) order torque harmonic is disrupted.

According to a further aspect of the present invention there is provided an electric drive motor for a vehicle, the electric drive motor comprising:

a stator having a plurality of slots;
a rotor having a plurality of poles, each pole comprising:
  at least a first permanent magnet centred on a d-axis of the pole; and
  a plurality of flux barriers for disrupting at least an $n^{th}$ order torque harmonic of the electric drive motor;
wherein, proximal to an outer surface of the rotor, a first angular period $\xi_1$ between first and second primary flux barriers is defined by:

$$\xi_1 = \frac{\tau}{n_2}$$

where: $\tau_1$ is the first angular period;
$\tau$ is the pole step; and
$n_2$ is an average order number of first and second torque harmonics to be disrupted.

In one embodiment the stator has forty-eight (48) slots and the rotor has eight (8) poles. The first and second torque harmonics to be disrupted may be at least the sixth ($6^{th}$) and twelfth ($12^{th}$) harmonics. The average order number $n_2$ is the numerical average of the order numbers of the harmonics to be disrupted and in this arrangement is calculated as nine (9) ((6+12)/2=9). Thus, in use, at least the sixth ($6^{th}$) and twelfth ($12^{th}$) order torque harmonics are disrupted.

The plurality of flux barriers may comprise a plurality of secondary flux barriers. The secondary flux barriers may have a smaller cross-sectional area than said primary flux barriers. The secondary flux barriers may each comprise a through hole extending through the rotor. The through holes may extend substantially parallel to a longitudinal axis of the rotor.

The angular period between adjacent secondary flux barriers may be substantially equal to the first angular period $\xi_1$.

The angular period between adjacent primary and secondary flux barriers may be half the first angular period $\xi_1$.

The secondary flux barriers may be disposed on the d-axis of the pole.

The secondary flux barriers may each comprise a trapezoidal aperture. The secondary flux barriers may each comprise a circular aperture.

One or more of said secondary flux barrier may be disposed between said first permanent magnet and/or said second permanent magnet and the radially outer surface of the rotor.

The primary flux barriers and/or the secondary flux barriers may be air-filled, for example in the form of an aperture or chamber in the rotor. Alternatively, the primary flux barriers and/or the secondary flux barriers may comprise a material having electrical conductivity and magnetic permeability equivalent to the corresponding parameters in air.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment may be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying Figures, in which.

DETAILED DESCRIPTION

Figure 1:
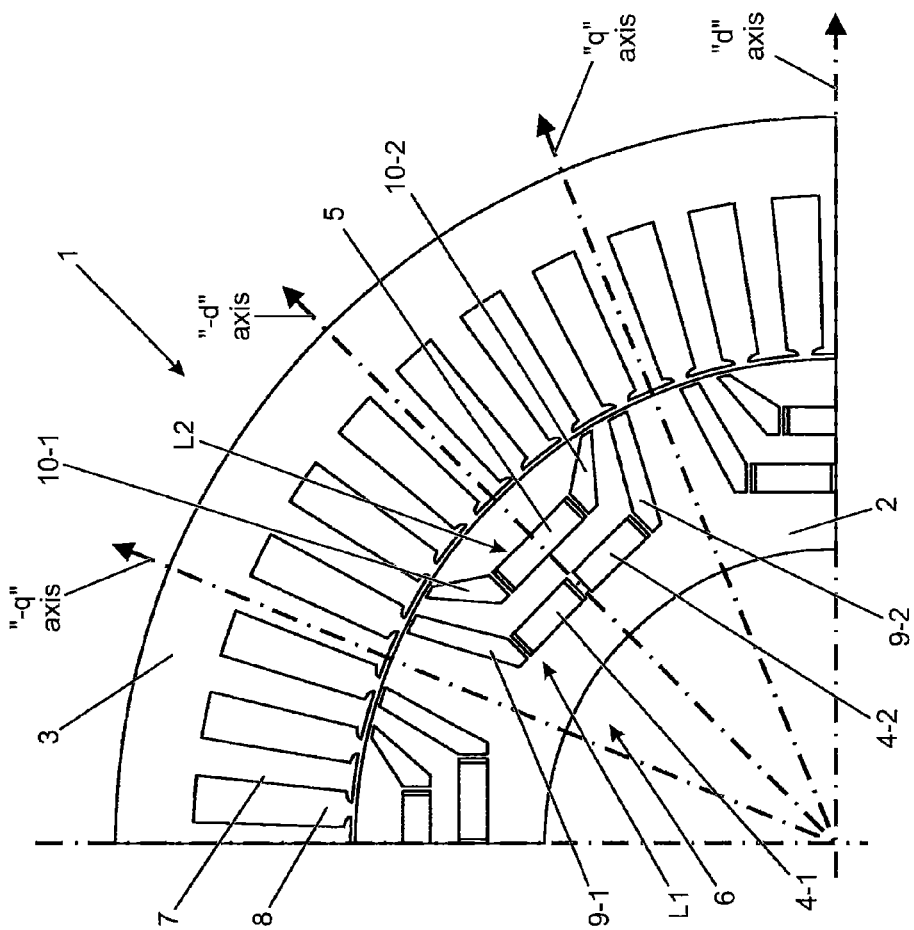
FIG. 1 shows a first electric drive motor having a non-optimised topology.

An electric drive motor 101 in accordance with an embodiment of the present invention will now be described. The first electric drive motor 101 is a permanent magnet synchronous motor intended for use as a traction drive in a motor vehicle. The first electric drive motor 101 is a variant of the electric drive motor 1 shown in FIG. 1. Like reference numerals will be used for like components albeit increased by 100 for clarity.

A quadrant of the first electric drive motor 101 is shown in FIG. 2. The first electric drive motor 101 is a permanent magnet synchronous motor comprising a rotor 102 and a stator 103. An air gap is maintained between the rotor 102 and the stator 103. The rotor 102 is made up of a plurality of laminations of a ferromagnetic material to form a rotor iron. First and second magnets 104, 105 are embedded in the rotor 102 to form a plurality of poles 106. In the present arrangement, the rotor 102 comprises eight (8) poles 106a-h. The first and second magnets 104, 105 are permanent magnets (PM) and generate a magnetic flux. The stator 103 comprises a plurality of slots 107 extending radially inwardly to support coil windings 108. In the present arrangement, the stator 103 comprises forty-eight (48) slots such that there are six (6) slots 107 for each pole 106. By energising the coil winding 108, a torque is generated to drive the rotor 102.

The poles 106a have the same general configuration and each have a pole step of 45°. For the sake of brevity, only a first pole 106a will be described herein. The reference frame comprising a d-axis and a q-axis will be used in the description of the first pole 106a. More particularly, the reference frame comprises a "+q-axis" and a "−q-axis" corresponding to the lateral boundaries of the first pole 106a.

Figures 2A, 2B:
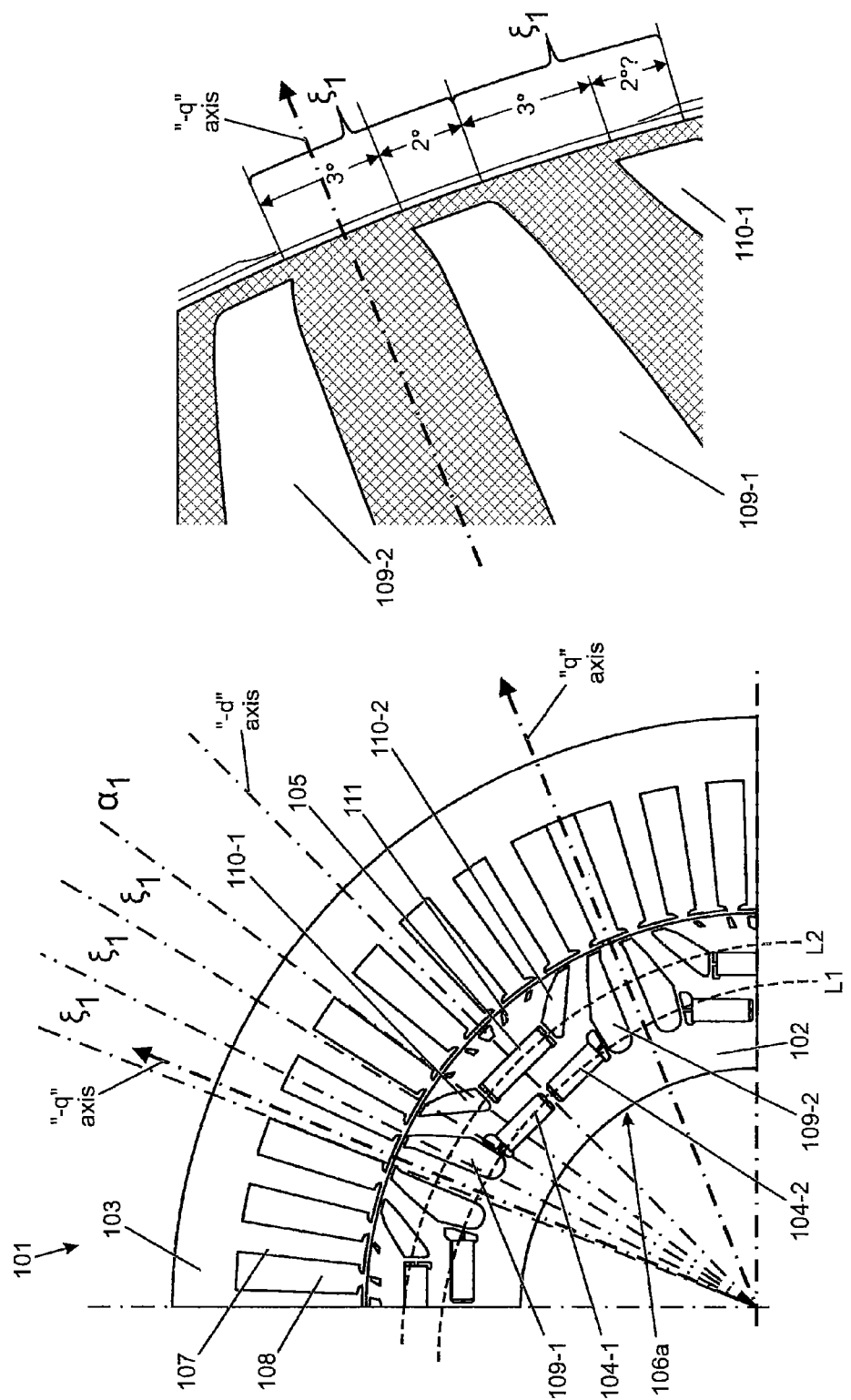
FIG. 2A shows a rotor for the first electric drive motor having a plurality of flux barriers arranged in accordance with an embodiment of the present invention.
FIG. 2B shows an enlarged view of a portion of the rotor shown in FIG. 2A.

The first and second magnets 104, 105 are arranged in first and second layers L1, L2, one above the other in a radial direction. As shown in FIG. 2A, a pair of said first magnets 104-1, 104-2 is arranged in the first layer L1; and one of said second magnets 105 is arranged in the second layer L2. The first and second magnets 104, 105 are arranged symmetrically about, and perpendicular to the d-axis. The first magnets 104 in the first layer L1 are disposed on respective sides of the d-axis. The second magnet 105 is disposed centrally within the first pole 106a such that the d-axis bisects the second magnet 105.

The first pole 106a comprises first and second primary flux barriers 109, 110 formed in the rotor 102 in first and second layers L1, L2 respectively. The first and second primary flux barriers 109, 110 are provided to ensure the appropriate flux density distribution at the lateral boundaries of the poles (i.e. the "+q axis" and a "−q axis"). The first and second primary flux barriers 109, 110 are formed from a material with a lower magnetic permeability than the material with which the rotor is formed. In some but not necessarily all examples the first and second primary flux barriers 109, 110 are air-filled cavities formed in the rotor 102. The first and second primary flux barriers 109, 110 are elongated and extend at an acute angle relative to the d-axis in a symmetrical configuration. The first primary flux barriers 109-1, 109-2 are disposed on respective sides of the first magnets 104-1, 104-2; and the second primary flux barriers 110-1, 110-2 are disposed on respective sides of the second magnet 105. The secondary flux barriers 111 are smaller than the primary flux barriers 109, 110 and each have a trapezoidal section which is elongated in a radial direction extending from a centre disposed on the d-axis of the first pole 106a. The primary and secondary flux barriers 109, 110,111 are through holes formed within the rotor 102 such that the outer surface of the rotor 102 is continuous.

The first pole 106a also comprises a plurality of secondary flux barriers 111 arranged symmetrically about the d-axis. The secondary flux barriers are disposed proximal to the surface of the rotor 102 in the region bounded laterally by the second primary flux barriers 110-1. The secondary flux barriers 111 are air-filled cavities formed in the rotor iron and have a smaller cross-section than the first and second primary flux barriers 109, 110. In the present arrangement, the first pole 106a comprises five (5) of said secondary flux barriers 111. The secondary flux barriers 111 are disposed in the region between the second magnet 105 and the outer surface of the rotor 102.

Figure 3A:
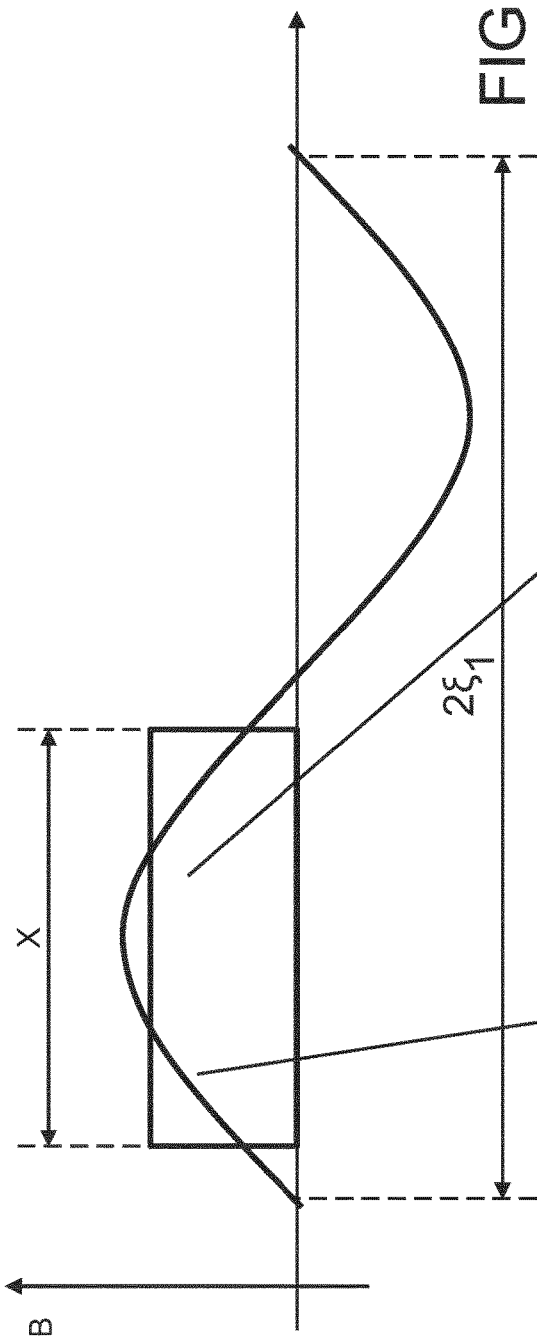
FIGS. 3A and 3B show first and second graphs illustrating the function of the flux barriers to split the flux density distribution in the air gap of the first and second electric drive motors.
Figure 3B:
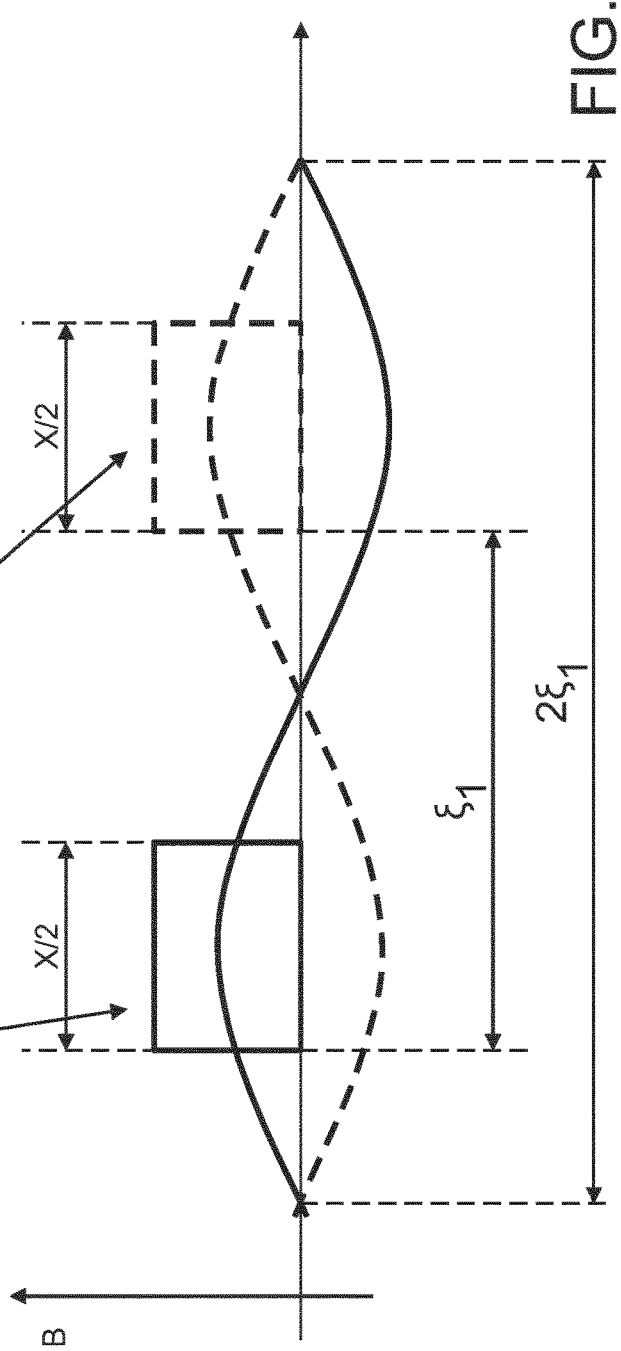

The primary and secondary flux barriers 109, 110, 111 are configured to decrease the amplitude of high harmonic voltage and torque components. In particular, the primary and secondary flux barriers 109, 110, 111 interrupt the flux density distribution in the air gap between the rotor 102 and the stator 103. By appropriate positioning of the primary and secondary flux barriers 109, 110, 111 in the rotor 102, the torque and voltage harmonics can be reduced. First and second graphs 112, 113 illustrating the function of the primary and secondary flux barriers 109, 110, 111 are provided in FIGS. 3A and 3B. The primary and secondary flux barriers 109, 110, 111 help to ensure the shift between the flux density impulses so that the desired harmonic component with half wavelength is equivalent to the shift between the flux barriers. The flux density T2 is represented in FIG. 3A. By splitting the signal harmonic having wavelength $\lambda=2T_1$ the torque ripple corresponding to this harmonic can be reduced or eliminated. The harmonic components of flux density are reduced, which develop the $6^{th}$ and $12^{th}$ torque ripple harmonic components. In addition to the shift of the impulses, the harmonic content of the flux density distribution can be reduced, as shown in FIG. 3B. This approach determines the influence of the width of the primary and secondary flux barriers 109, 110, 111; and/or the distance between adjacent primary and secondary flux barriers 109, 110, 111. The magnetic permittivity of air should not be neglected compared to the ferromagnetic iron, especially when the parts of iron are saturated. The geometrical edges and the "magnetic edges" do not necessarily coincide. Accordingly, it may be necessary to optimize the position and/or size (width) of the primary and/or second flux barriers 109, 110, 111 around the predicted positions by the method described herein.

A first angular period $\mathfrak{I}_1$ between the adjacent primary flux barriers 109, 110 can be determined as follows:

$$\xi_1 = \frac{\tau}{n_1} \qquad \text{Equation (1)}$$

where: $\mathfrak{I}_1$ is the first angular period;

τ is the pole step; and $n_1$ is an order number of a torque harmonic to be disrupted.

As outlined above, the stator 103 has forty-eight (48) slots 107 and the rotor 102 has eight (8) poles 106. The possible torque harmonic components for an eight (8) pole 106, forty-eight (48) slot 107 machine are the $6^{th}$, $12^{th}$, $18^{th}$ and $24^{th}$ harmonics. It has been recognised that first and second torque harmonics can be disrupted by calculating the first angular period $\mathfrak{I}_1$ in dependence on an arithmetical average $n_2$ of the order numbers of the first and second torque harmonics. The first angular period $\mathfrak{I}_1$ between the adjacent primary and secondary flux barriers 110, 111 can be defined as follows:

$$\xi_1 = \frac{\tau}{n_2} \qquad \text{Equation (2)}$$

where: $\mathfrak{I}_1$ is the first angular period;

τ is the pole step; and $n_2$ is an average order number of first and second torque harmonics to be disrupted. The precise value of the first angular period $\xi_1$ may require some refining due to the challenge in determining the exact distribution of the magnetic field using analytical techniques.

By way of example, determining the first angular period $\xi_1$ in dependence on a numerical average of the $6^{th}$ and $12^{th}$ order numbers will reduce the corresponding harmonics. The rotor 102 has eight (8) poles 106 each having a pole step of 45°. Applying equation (2), the sixth ($6^{th}$) and twelfth ($12^{th}$) order torque harmonic are disrupted by using the average order number $n_2$=9 (calculated based on the numerical average (6+12)/2). Thus, the first angular period $\xi_1$ between corresponding lateral edges of the first and second primary flux barriers 109, 110 is calculated as 5° in the present embodiment; this configuration is illustrated in FIGS. 2A and 2B. At their radially outer ends, the first and second primary flux barriers each have a radial extent of 2°; and a separation angle of 3° between the first and second primary flux barriers 109, 110. A separation angle of 3° is also defined between the first primary flux barriers 109 in adjacent poles 106. Furthermore, the first angular period $\xi_1$ defines the angular offset between corresponding edges of the second primary flux barrier 110 and the outermost secondary flux barrier 111.

In the present embodiment, there are five of said secondary flux barriers 111. A central one of said secondary flux barriers 111 is disposed on the d-axis of the first pole 106a; and the remaining secondary flux barriers 111 are arranged symmetrically about the d-axis between the second primary flux barriers 110.

The distribution of ferromagnetic material within the rotor 102 and the stator 103 is non-uniform which can establish torque and voltage characteristics containing harmonic components. Any such harmonic components can interact to generate torque ripples which, in use, may cause noise and unwanted vibrations. As described herein, the configuration of the primary and secondary flux barriers 109, 110, 111 disrupts the torque harmonic components, thereby reducing the torque harmonics which reduce the torque ripples. In the present arrangement, the primary and secondary flux barriers 109, 110, 111 are arranged to reduce the sixth ($6^{th}$) and twelfth ($12^{th}$) order torque harmonics.

Figure 4:
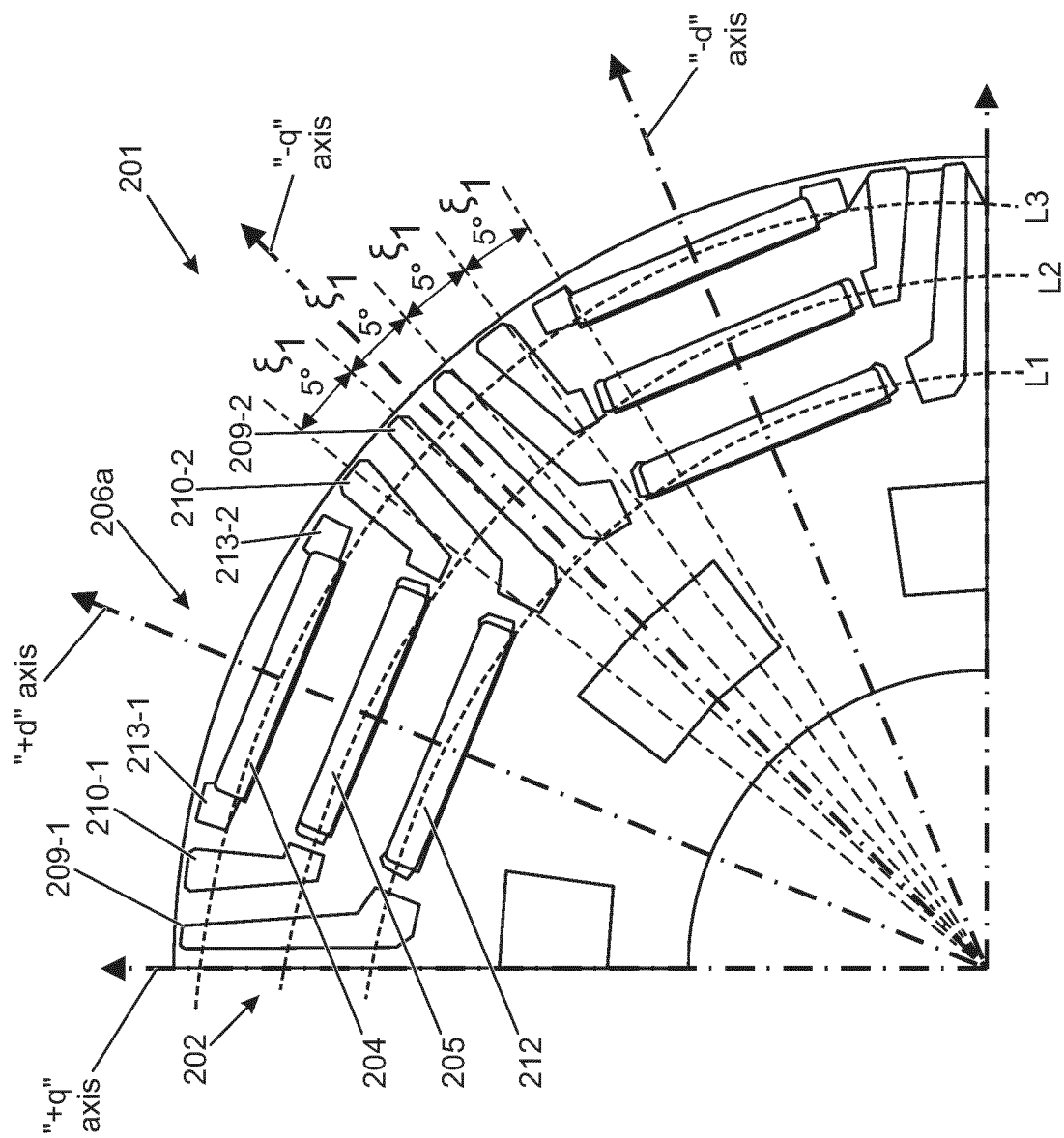
FIG. 4 shows a variant of the rotor for the first electric drive motor having a plurality of flux barriers arranged in accordance with an embodiment of the present invention.

A quadrant of a second electric drive motor 201 is shown in FIG. 4. The second electric drive motor 201 is similar to the first electric drive motor 101 and like reference numerals will be used for like features, albeit incremented by 100 for clarity. The second electric drive motor 201 is a permanent magnet synchronous motor comprising a rotor 202 and a stator. An air gap is maintained between the rotor 202 and the stator. The rotor 202 is made up of a plurality of laminations of a ferromagnetic material to form a rotor iron. The rotor 202 comprises first magnets 204, second magnets 205 and third magnets 212 arranged in first, second and third layers L1, L2, L3. The first, second and third magnets 204, 205, 212 are embedded in the rotor 202 to form a plurality of poles 206. In the present arrangement, the rotor 202 comprises eight (8) poles 206a-h. The first, second and third magnets 204, 205, 212 are permanent magnets (PM) and generate a magnetic flux. The stator comprises a plurality of slots extending radially inwardly to support coil windings. In the present arrangement, the stator comprises forty-eight (48) slots such that there are six (6) slots for each pole 206. By energising the coil winding, a torque is generated to drive the rotor 202.

The poles 206a-h have the same general configuration. For the sake of brevity, only a first pole 206a will be described herein. A reference frame comprising a d-axis and a q-axis will be used in the description of the first pole 206a. More particularly, the reference frame comprises a "+q-axis" and a "−q-axis" corresponding to the lateral boundaries of the first pole 206a.

The first, second and third magnets 204, 205, 212 are centred on the d-axis of the first pole 206a and are arranged substantially parallel to each other. The first pole 206a comprises first, second and third primary flux barriers 209, 210, 213 formed in the rotor 202. The first, second and third primary flux barriers 209, 210, 213 are provided to ensure the appropriate flux density distribution at the lateral boundaries of the poles 206a-h (i.e. the "+q axis" and a "−q axis"). The first, second and third primary flux barriers 209, 210, 213 are air-filled cavities formed in the rotor 202. The first, second and third primary flux barriers 209, 210, 213 are elongated and extend at an acute angle relative to the d-axis in a symmetrical configuration. The first primary flux barriers 209-1, 209-2 are disposed on respective sides of the first magnet 204; and the second primary flux barriers 210-1, 210-2 are disposed on respective sides of the second magnet 205; and the third primary flux barriers 213-1, 213-2 are disposed on respective sides of the third magnet 212. The first, second and third primary flux barriers 209, 210, 213 are through holes formed within the rotor 202 such that the outer surface of the rotor 202 is continuous.

The first, second and third primary flux barriers 209, 210, 213 can be configured to reduce ripple and voltage harmonics of the second electric drive motor 201. The first angular period $\xi_1$ between the first, second and third primary flux barriers 209, 210, 213 is selected to disrupt first and second torque harmonics. The possible torque harmonic components for the second electric drive motor 201 are the $6^{th}$, $12^{th}$, $18^{th}$ and $24^{th}$ harmonics. As outlined above in relation to the first electric drive motor 101, first and second of said torque harmonics can be disrupted by calculating the first angular period $\xi_1$ in dependence on an arithmetical average $n_2$ of the order numbers of the first and second torque harmonics. The first angular period $\xi_1$ between the adjacent primary and secondary flux barriers 209, 210 can be determined by applying equation (2) outlined above.

The first pole 206a has a pole step T of 45°. The average order number $n_2$ is calculated as nine (9) to disrupt the $6^{th}$ and $12^{th}$ torque harmonics. As shown in FIG. 4, the first angular period $\xi_1$ between the first, second and third primary flux barriers 209, 210, 213 is calculated as 5°. The first angular period $\xi_1$ is measured between corresponding lateral edges of the adjacent flux barriers 209, 210, 213.

It will be appreciated that various changes and modifications can be made to the apparatus and methods described herein without departing from the present invention.

The invention claimed is:

1. An electric drive motor for a vehicle, the electric drive motor comprising:
    a stator; and
    a rotor having a plurality of poles, each pole comprising:
        at least a first permanent magnet centered on a d-axis of the pole;
        at least one second permanent magnet; and
        a plurality of flux barriers, comprising first and second primary flux barriers, for disrupting at least an $n^{th}$ order torque harmonic of the electric drive motor;
        wherein the plurality of flux barriers comprises a pair of first primary flux barriers associated with the first permanent magnet and disposed symmetrically about the d-axis, and a pair of second primary flux barriers associated with the at least one second permanent magnet and disposed symmetrically about the d-axis;
        wherein, at radially outer ends of the flux barriers, proximal to an outer surface of the rotor, a first angular period $\xi_1$ between corresponding lateral edges of adjacent first and second primary flux barriers is defined by:

$$\xi_1 = \frac{\tau}{n_1}$$

where: $\xi_1$ is the first angular period;
$\tau$ is the pole step; and
$n_1$ is an order number of a torque harmonic to be disrupted, selected to provide a value of $\xi_1$ that is equal to 5°;
wherein the first and second primary flux barriers on each side of the pole are separated from each other by the first angular period $\xi_1$.

2. An electric drive motor for a vehicle, the electric drive motor comprising:
a stator; and
a rotor having a plurality of poles, each pole comprising:
at least a first permanent magnet centered on a d-axis of the pole;
at least one second permanent magnet; and
a plurality of flux barriers, comprising first and second primary flux barriers, for disrupting at least an $n^{th}$ order torque harmonic of the electric drive motor;
wherein the plurality of flux barriers comprises a pair of first primary flux barriers associated with the first permanent magnet and disposed symmetrically about the d-axis, and a pair of second primary flux barriers associated with the at least one second permanent magnet and disposed symmetrically about the d-axis;
wherein, at radially outer ends of the flux barriers, proximal to an outer surface of the rotor, a first angular period $\xi_1$ between corresponding lateral edges of adjacent first and second primary flux barriers is defined by:

$$\xi_1 = \frac{\tau}{n_2}$$

where: $\xi_1$ is the first angular period;
$\tau$ is the pole step; and
$n_2$ is an average order number of first and second torque harmonics to be disrupted, selected to provide a value of $\xi_1$ that is equal to 5°;
wherein the first and second primary flux barriers on each side of the pole are separated from each other by the first angular period $\xi_1$.

3. The electric drive motor as claimed in claim 2, wherein the stator has forty-eight (48) slots and the rotor has eight (8) poles, and wherein an average order number $n_2$ is nine (9) such that at least a sixth ($6^{th}$) and a twelfth ($12^{th}$) torque harmonics are disrupted.

4. The electric drive motor as claimed in claim 1, wherein the plurality of flux barriers comprises a plurality of secondary flux barriers.

5. The electric drive motor as claimed in claim 4, wherein an angular period between adjacent primary and secondary flux barriers is substantially equal to the first angular period $\xi_1$.

6. The electric drive motor as claimed in claim 4, further comprising one of the plurality of secondary flux barriers disposed on the d-axis of the pole.

7. The electric drive motor as claimed in claim 4, wherein one or more of the plurality of secondary flux barriers is disposed between the first permanent magnet and an outer surface of the rotor.

8. A vehicle having an electric drive motor as claimed in claim 1.

9. An electric drive motor as claimed in claim 2, wherein the plurality of flux barriers comprises a plurality of secondary flux barriers.

10. An electric drive motor as claimed in claim 9, wherein an angular period between adjacent primary and secondary flux barriers is substantially equal to the first angular period $\xi_1$.

11. An electric drive motor as claimed in claim 9, further comprising one of the plurality of secondary flux barriers disposed on the d-axis of the pole.

12. An electric drive motor as claimed in claim 9, wherein one or more of the plurality of secondary flux barriers is disposed between the first permanent magnet and an outer surface of the rotor.

13. A vehicle having an electric drive motor as claimed in claim 9.

14. The electric drive motor as claimed in claim 1, wherein the flux barriers are filled with air or filled with another material having electrical conductivity and magnetic permeability equivalent to corresponding parameters in air.

15. The electric drive motor as claimed in claim 2, wherein the flux barriers are filled with air or filled with another material having electrical conductivity and magnetic permeability equivalent to corresponding parameters in air.

16. An electric drive motor for a vehicle, the electric drive motor comprising:
a stator; and
a rotor having a plurality of poles, each pole comprising:
at least a first permanent magnet centered on a d-axis of the pole;
at least one second permanent magnet; and
a plurality of flux barriers, comprising first and second primary flux barriers, for disrupting at least an $n^{th}$ order torque harmonic of the electric drive motor;
wherein the plurality of flux barriers comprises a pair of first primary flux barriers associated with the first permanent magnet and disposed symmetrically about the d-axis, and a pair of second primary flux barriers associated with the at least one second permanent magnet and disposed symmetrically about the d-axis;
wherein, at radially outer ends of the flux barriers, proximal to an outer surface of the rotor, a first angular period $\xi_1$ between corresponding lateral edges of adjacent first and second primary flux barriers is defined by:

$$\xi_1 = \frac{\tau}{n_2}$$

where: $\xi_1$ is the first angular period;
$\tau$ is the pole step; and
$n_2$ is an average order number of first and second torque harmonics to be disrupted,
wherein the stator has forty-eight (48) slots and the rotor has eight (8) poles, and wherein an average order number $n_2$ is nine (9) such that at least a sixth ($6^{th}$) and a twelfth ($12^{th}$) torque harmonics are disrupted, and
wherein the first and second primary flux barriers on each side of the pole are separated from each other by the first angular period $\xi_1$.

* * * * *